United States Patent
Chan et al.

(10) Patent No.: US 10,311,201 B2
(45) Date of Patent: Jun. 4, 2019

(54) ALIGNMENT KEY DESIGN RULE CHECK FOR CORRECT PLACEMENT OF ABUTTING CELLS IN AN INTEGRATED CIRCUIT

(71) Applicant: GLOBALFOUNDRIES INC., Grand Cayman (KY)

(72) Inventors: Nigel Chan, Dresden (DE); Germain Bossu, Dresden (DE)

(73) Assignee: GLOBALFOUNDRIES INC., Grand Cayman (KY)

( * ) Notice: Subject to any disclaimer, the term of this patent is extended or adjusted under 35 U.S.C. 154(b) by 23 days.

(21) Appl. No.: 15/670,158

(22) Filed: Aug. 7, 2017

(65) Prior Publication Data

US 2019/0042689 A1    Feb. 7, 2019

(51) Int. Cl.
*G06F 17/50* (2006.01)

(52) U.S. Cl.
CPC ...... *G06F 17/5081* (2013.01); *G06F 17/5072* (2013.01); *G06F 2217/06* (2013.01)

(58) Field of Classification Search
CPC .......................... G06F 17/5081; G06F 17/5072
USPC ........................................................ 716/112
See application file for complete search history.

(56) References Cited

U.S. PATENT DOCUMENTS

| | | | |
|---|---|---|---|
| 6,374,395 B1 | 4/2002 | Wang | |
| 6,918,102 B2 | 7/2005 | Rutenbar et al. | |
| 7,386,821 B2 * | 6/2008 | Higman | G06F 17/5072 716/122 |
| 8,473,874 B1 * | 6/2013 | Sharma | G06F 17/5081 700/120 |
| 8,694,941 B1 * | 4/2014 | Badel | G06F 17/5072 716/122 |
| 8,799,836 B1 * | 8/2014 | Bickford | G06F 17/5081 716/102 |
| 9,262,570 B2 | 2/2016 | Hsu et al. | |
| 9,269,702 B2 | 2/2016 | Quandt et al. | |
| 9,963,063 B2 * | 5/2018 | Fernandez | B60P 7/0846 |
| 2006/0026545 A1 * | 2/2006 | Allen | G06F 17/5072 716/122 |
| 2008/0005717 A1 * | 1/2008 | Higman | G06F 17/5072 716/122 |
| 2009/0319975 A1 * | 12/2009 | Huynh | G06F 17/5072 716/122 |
| 2012/0124536 A1 * | 5/2012 | Sharma | G06F 17/5081 716/112 |

(Continued)

*Primary Examiner* — Stacy Whitmore
(74) *Attorney, Agent, or Firm* — Gibb & Riley, LLC; David A. Cain, Esq.

(57) ABSTRACT

Methods and a computer program product are described for placing, by an electronic design tool, a first alignment key shape of a first cell and a second alignment key shape of a second cell positioned on a common edge where the first cell abuts the second cell in a physical layout design. An abutting alignment key shape is formed by placement of the first alignment key shape and the second alignment key shape in the physical layout design. The abutting alignment key shape is checked by a design rule to identify a disallowed cell placement of the first cell relative to the second cell when the abutting alignment key shape does not form a pre-defined shape of a correct size. The disallowed cell placement is corrected, by a designer, through substitution of an allowed cell placement to provide a corrected physical layout design for manufacture of the IC.

16 Claims, 10 Drawing Sheets

(56) References Cited

U.S. PATENT DOCUMENTS

| | | | |
|---|---|---|---|
| 2013/0207199 A1* | 8/2013 | Becker | H01L 27/092 257/369 |
| 2014/0282344 A1* | 9/2014 | Hsu | G06F 17/5072 716/123 |
| 2015/0089457 A1* | 3/2015 | Agarwal | G03F 1/70 716/52 |
| 2015/0100935 A1* | 4/2015 | Lin | G06F 17/5081 716/111 |
| 2015/0278428 A1* | 10/2015 | Wang | G06F 17/5081 716/112 |
| 2015/0339429 A1* | 11/2015 | Zou | G06F 17/5081 716/52 |
| 2017/0255740 A1* | 9/2017 | Hsu | G06F 17/5081 |
| 2018/0165399 A1* | 6/2018 | Yang | G06F 17/5072 |
| 2018/0239862 A1* | 8/2018 | Hsu | G06F 17/5081 |

* cited by examiner

FIG. 3B

| BIT NUMBER | |
|---|---|
| 0 | 2 |
| 1 | 3 |

ALIGNMENT KEY SUPERPOSITION

| A_right ⇕ A_left | B_right ⇕ B_left |
|---|---|
| A_right ⇕ A_left | B_right ⇕ B_left |

301

| | | | |
|---|---|---|---|
| BIT NUMBER | 0 | 1 | 2 |
| | 3 | 4 | 5 |
| | 6 | 7 | 8 |

| | | | |
|---|---|---|---|
| ALIGNMENT KEY SUPERPOSITION | A_left ⇕ A_right | B_right ⇕ B_left | C_right ⇕ C_left |
| | A_left ⇕ A_right | B_right ⇕ B_left | C_right ⇕ C_left |
| | C_left ⇕ A_right | B_right ⇕ B_left | C_right ⇕ C_left |

ALIGNMENT KEY DESIGN RULE CHECK FOR CORRECT PLACEMENT OF ABUTTING CELLS IN AN INTEGRATED CIRCUIT

FIELD OF THE INVENTION

The present invention relates to the design of semiconductor devices, and more particularly, to designing a physical layout of abutting cells for an integrated circuit (IC) that is free of placement errors when validated by a design rule check, which is applied to alignment key shapes embedded in a dedicated software layer for each cell.

BACKGROUND

In semiconductor design, a cell-based methodology is a method of designing integrated circuits (ICs), whereby an electronic design tool maps geometric representations of cells into a physical layout layer of the IC design. A cell can include a Boolean logic function, such as, AND, NAND, OR, NOR, XOR and inversion, a storage function, such as a flip-flop or a latch, an incomplete portion of logic, or an analog function. The cell may represent a reusable unit of logic or storage, whose design is the intellectual property (IP) of a cell designer, a manufacturer, or a third party other than the designer or manufacturer.

Design rule checking (DRC) is an area of electronic design automation that determines whether the physical layout of an IC satisfies a number of recommended parameters called design rules. Design rules, provided by designers and manufacturers, enable the cell designer to verify the correctness of a physical layout for manufacturing an IC. A design rule specifies certain geometric and connectivity restrictions to ensure sufficient margins to account for the variability of IC manufacturing processes so as to increase yield.

SUMMARY

In view of the foregoing, disclosed herein are methods and a computer program product for placing pre-defined cells in a physical layout design that is free of cell placement errors when validated by a design rule check (DRC).

According to an embodiment of the present invention, a method for placing pre-defined cells in a physical layout design that is free of cell placement errors when validated by a design rule check (DRC) is provided. The method includes graphically placing, by an electronic design tool, a first alignment key shape on a first edge of a first cell and a second alignment key shape on a second edge of a second cell, the first edge and the second edge forming a common edge where the first cell abuts the second cell in a physical layout design of an integrated circuit (IC). The method also includes checking an abutting alignment key shape, formed by placing the first alignment key shape and the second alignment key shape in the physical layout design, by a design rule to identify a disallowed cell placement of the first cell relative to the second cell when the abutting alignment key shape does not form a pre-defined shape of a correct size. Finally, the method includes correcting, by a designer, the disallowed cell placement by substituting an allowed cell placement to provide a corrected physical layout design for manufacture of the IC.

According to another embodiment of the invention, a method for placing pre-defined cells in a physical layout design that is free of placement errors when validated by a design rule check (DRC) is provided. The method includes graphically placing, by an electronic design tool, a first alignment key shape on a first edge of a first cell and a second alignment key shape on a second edge of a second cell, the first edge and the second edge forming a common edge where the first cell abuts the second cell in a physical layout design of an integrated circuit (IC), the first alignment key shape and the second alignment key shape each comprising a number of elementary shapes. The method also includes checking a superimposed alignment key shape, formed by superimposing the first alignment key shape and the second alignment key shape, by a design rule to identify a disallowed cell placement of the first cell relative to the second cell when the superimposed alignment key shape does not form a pre-defined shape. Finally, the method includes correcting, by a designer, the disallowed cell placement by substituting an allowed cell placement, to provide a corrected physical layout design for manufacture of the IC.

BRIEF DESCRIPTION OF THE DRAWINGS

The foregoing and other exemplary aspects of the present invention will be better understood from the following detailed description of exemplary structures and methods herein with reference to the drawings, in which:

FIG. 3A is a schematic illustrating superpositioned alignment key shapes, where each elemental shape corresponds to one of the possible cell edge interactions of two abutting cells A and B in a physical layout design;

FIG. 3B is a schematic illustrating bit numbers of an alignment key binary value that correspond to each one of the possible cell edge interactions represented by the superpositioned alignment key shapes of FIG. 3A for the two abutting cells A and B in a physical layout design;

FIG. 4A is a schematic illustrating superpositioned alignment key shapes, where each elemental shape corresponds to one of the possible cell edge interactions of three of abutting cells A, B, and C in a physical layout design;

FIG. 4B is a schematic illustrating bit numbers of an alignment key binary value that correspond to each one of the possible cell edge interactions represented by the superpositioned alignment key shapes of FIG. 4A for the three abutting cells A, B and C in a physical layout design;

DETAILED DESCRIPTION

Figures 1A, 1B:
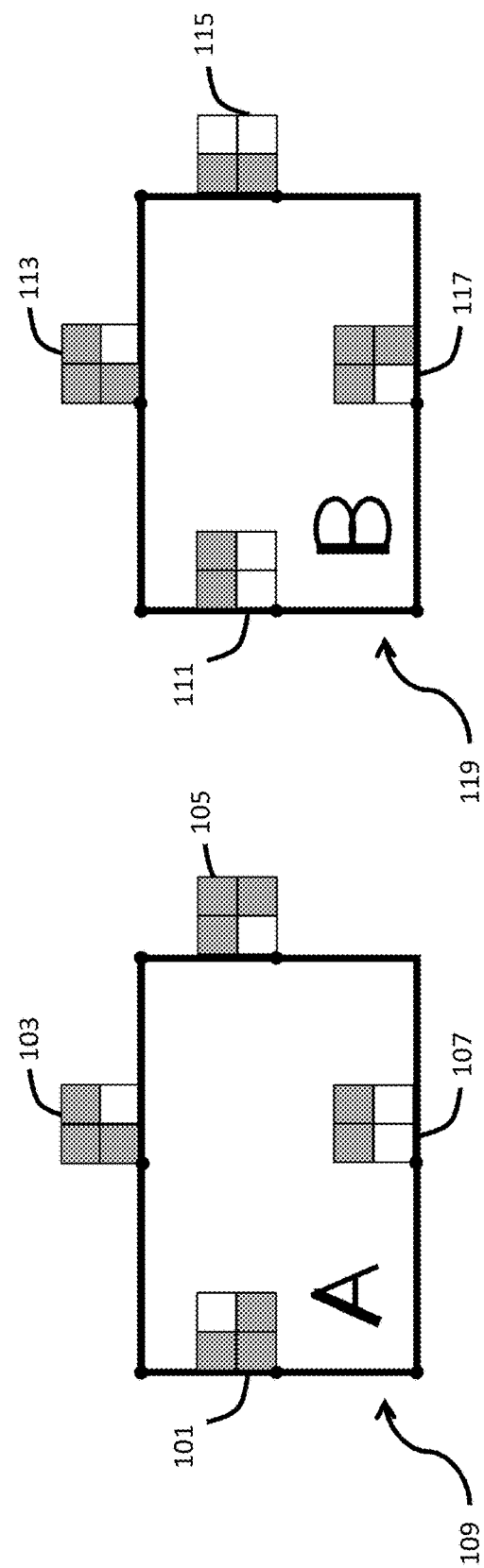
FIG. 1A is a schematic illustrating an alignment key shape that is graphically located on each edge of a cell A in a physical layout design, so as to orient the cell A in the physical layout design.
FIG. 1B is a schematic illustrating an alignment key shape that is graphically located on each edge of a cell B in a physical layout design, so as to orient the cell B in the physical layout design.

During design of a physical layout of cells for an integrated circuit (IC), identifying an incorrect placement of a pre-defined cell relative to other pre-defined abutting cells is frequently problematic. As more double, triple and/or quadruple patterning is needed for the manufacturing of advanced node technologies, the number of cells required to build, for example, an array-based memory, increases. In particular, where top layer cells can each instantiate lower layer cells of a more advanced node using double, triple or, quadruple patterning, the top layer cells can look similar. Thus, the risk of incorrectly placing one or more cells in the physical layout design of the exemplary array-based memory can also increase. The incorrect placement of cells may be further confounded when cells of a third party's IP, which are unfamiliar to the designer or manufacturer, are incorporated into the physical layout design.

To address the problems outlined above, the present invention creates, by a software design tool, "alignment key shapes" that are stored in a software alignment layer for each cell. Each alignment key shape includes a number of elemental shapes that is equal to the number of cell edge interactions between two abutting cells. The abutting cells may be the same, e.g., a cell of type A may abut another cell of type A, or different, e.g., a cell of type A may abut a cell of type B. The alignment key shapes of two abutting cells are graphically superimposed by the software design tool of the invention to determine whether the two abutting cells are correctly placed. The superimposed alignment key shapes are subjected to a conventional design rule check (DRC) using an existing method, to check for a pre-defined shape that indicates a correct or an incorrect cell placement.

In an exemplary method of the invention, the designer lists all cells of the physical layout design that are to be checked for placement. Thereafter, a relative orientation of each cell is defined by alignment keys that are graphically located on the edges of each cell in the physical layout design. For each edge of each cell, all possible cell edge interactions between abutting cells' edges are defined as one of allowed and disallowed. Each alignment key has an alignment key shape that comprises a number of elemental shapes, equal in number to the number of possible cell edge interactions between abutting cells. A multi-bit binary value may be generated for each alignment key, where a bit value of 1 represents an allowed cell edge interaction between the abutting cells and a bit value of 0 represents a disallowed cell edge interaction between the abutting cells. Graphically superimposing alignment key shapes, where all of the superimposed elemental shapes are filled, forms a pre-defined shape that indicates the two abutting cells are correctly placed; whereas, one or more unfilled elemental shapes in the superimposed alignment key shapes indicates that the two abutting cells are incorrectly placed. The alignment key shapes for each cell edge of each cell of the physical layout design are stored in a software alignment layer for each pre-defined cell of the designer's IP. The manufacturer or IP customer may then review a top level physical layout of each cell in the physical layout design with an electronic design tool of the invention that applies a conventional Design Rule Check (DRC), i.e., a check for the pre-defined shape, to the superimposed alignment key shapes of the abutting cells, to identify a correct or an incorrect cell placement.

Referring to FIG. 1A, an exemplary method of the invention illustrates graphical alignment key shapes 101-107, which are located on each edge of cell A 109 and may orient the cell A109 along the axes of a rectilinear cell array in a physical layout design. Each alignment key 101-107 may incorporate its orientation relative to the cell's edges into its name, i.e., A_left 101, A_top 103, A_right 105, and A_bottom 107, when arranged along an x-axis of the rectilinear cell array.

Similarly, referring to FIG. 1B, graphical alignment key shapes 111-117 are also located on each edge of the cell B 119, and may orient the cell B 119 along the axes of the rectilinear cell array. Each alignment key 111-117 may again incorporate its orientation relative to the cell's edges into its name, i.e., B_left 111, B_top 113, B_right 115, and B_bottom 117, when arranged along the x-axis of the rectilinear cell array.

An alignment key shape may comprise a number of elemental shapes equal to the number of possible cell edge interactions between abutting cells of the physical layout design along the axes of the array. In an exemplary case where the two cells A 109 and B 119 of FIGS. 1A and 1B abut along a common edge oriented perpendicularly to the x-axis, two alignment key shapes, 105 for cell A 109 and 111 for cell B 119, each comprising four elemental shapes may be defined for a left-positioned cell A 109 and a right-positioned cell B 119. Similarly, alignment key shapes may be defined for: a left-positioned cell A109 and a right-positioned cell A 109; a right-positioned cell A 109 and a left-positioned cell B 119; and a right-positioned cell B 119 and a left-positioned cell B 119. Thus, we see that the number of cell edge interactions between two types of abutting cells A 109 and B119 along the x-axis of a physical layout design equals four possible cell edge interactions.

As would be obvious to one of ordinary skill in the art, an additional four possible cell edge interactions (not shown) may also be defined for the two abutting cell types A 109 and B 119 along a common edge oriented perpendicularly to the y-axis. For example, two alignment key shapes, 103 for cell A 109 and 117 for cell B 119, each comprising four elemental shapes, may be defined for a bottom-positioned cell A 109 and a top-positioned cell B 119. Similarly, alignment key shapes may be defined for: a bottom-positioned cell A 109 and a top-positioned cell A109, a bottom-positioned cell B 119 and a top-positioned cell A 109; and a bottom-positioned cell B 119 and a top-positioned cell B 119. Similarly, alignment key shapes may also be defined for abutting cells along the z-axis of a 3-dimensional array (not shown).

Figure 2A:
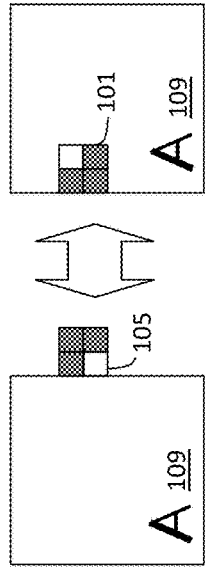
FIG. 2A is a schematic illustrating the graphical superposition of a right alignment key of a left-positioned cell A on a left alignment key of a right-positioned cell A in a physical layout design.

For example, in FIG. 2A, an alignment key shape, A_right 105, of a left-positioned cell A 109 may be graphically superimposed on an alignment key shape, A_left 101, of a right-positioned cell A 109 at cell edge 205 to produce a completely-filled superimposed alignment key shape 207. The completely-filled superimposed alignment key shape 207 indicates that the cell edge interaction between A_right 105 and A_left 101 is allowed, i.e., produces an abutting cell edge interaction that does not contain a placement error which could negatively impact manufacturability or even functionality of the abutting cells as determined by the cell designer.

Figure 2B:
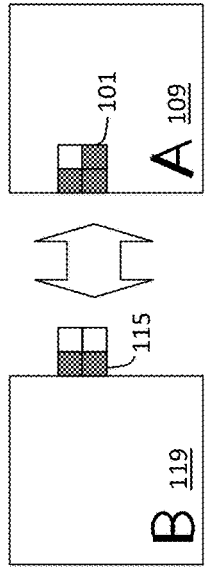
FIG. 2B is a schematic illustrating the graphical superposition of a right alignment key of a left-positioned cell B on a left alignment key of a right-positioned cell A in a physical layout design.

In contrast, as illustrated by exemplary FIG. 2B, an alignment key shape, B_right 115, of left-positioned cell B 119 cannot be superimposed on the alignment key shape, A_left 101, of right-positioned cell A109 at cell edge 215 to completely fill alignment key shape 217. The incompletely-filled superimposed alignment key shape 217 indicates that a cell edge interaction between, B_right 115 and A_left 101 is disallowed, i.e., produces a placement error that can negatively impact manufacturability or even functionality of the abutting cells as determined by the cell designer.

Figure 2C:
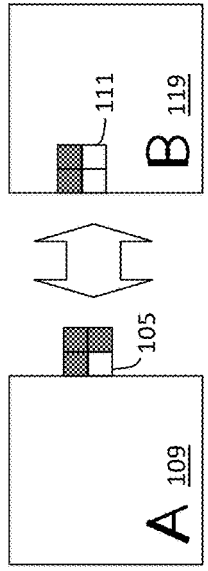
FIG. 2C is a schematic illustrating the graphical superposition of a right alignment key of a left-positioned cell A on a left alignment key of a right-positioned cell B in a physical layout design.
Figure 2D:
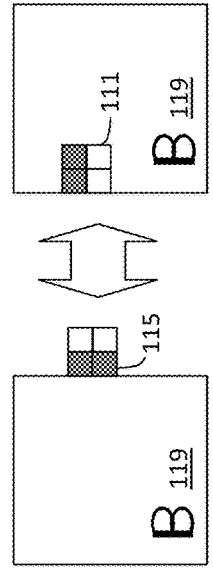
FIG. 2D is a schematic illustrating the graphical superposition of a right alignment key of a left-positioned cell B on a left alignment key of a right-positioned cell B in a physical layout design.

Similarly, the exemplary alignment key shapes of FIG. 2C, i.e., A_right 105 of left-positioned cell A_109 and B_left 111 of right-positioned cell B 119, and FIG. 2D, i.e., B_right 115 of left-positioned cell B 119 and B_left 111 of right-positioned cell B 119, cannot be superimposed at cell edges 225 and 235, respectively, to produce completely-filled superimposed alignment key shapes 227 and 237, respectively. Thus, the incompletely-filled superimposed alignment key shapes 227 and 237 indicate disallowed cell edge interactions that produce placement errors, which can negatively impact manufacturability or even functionality of the abutting cells as determined by the cell designer.

The exemplary four possible cell edge interactions along the x-axis of a rectilinear cell array for two abutting cell types A and B, which correspond to the alignment key shape superpositions 301 of FIG. 3A, may correspond to an alignment key's bit value. For example, among the four possible cell edge interactions of FIG. 2A-D, only one superposition, i.e., the A_left key of the right-positioned cell A and the A_right key of the left-positioned cell A, is allowed, while each of the three other superpositions—the A_left key of the right-positioned cell A and the B_right key of the left-positioned cell B, the B_left key of the right-positioned cell B and the A_right key of the left-positioned cell A, and the B_left key of the right-positioned cell B and the B_right key of the left-positioned cell B—are disallowed, as shown in Table 1, below.

TABLE 1

| INPUTS | | |
|---|---|---|
|  | Right-positioned cell | Left-positioned cell |
| Allowed | A_left key | A_right key |
| Disallowed | A_left key | B_right key |
| Disallowed | B_left key | A_right key |
| Disallowed | B_left key | B_right key. |

The allowed superposition may assign a bit value of 1 to bit number zero of the four-bit alignment key's bit value 302 of FIG. 3B. To assure that the superposition or logical OR operation applied to the keys for bit number 0 will result in a bit value of 1, all of the keys, A_left, A_right, B_left, and B_right, are assigned bit values of 1, as shown in Table 2, below.

TABLE 2

| KEYS FOR BIT NUMBER 0 | |
|---|---|
|  | Bit Number 0 |
| A_left key | 1 |
| B_left key | 1 |
| A_right key | 1 |
| B_right key | 1, |

Table 3, below, shows that when the keys of the right-positioned cell and of the left-positioned cell interact according to a bit-wise logical OR operation, all the key interactions produce a bit value of 1. However, only the allowed key interaction of A_left and A_right is to be considered for bit number zero of the to-be-determined four-bit alignment key.

TABLE 3

| INTERACTIONS FOR BIT NUMBER 0 | | | |
|---|---|---|---|
| Right cell | Left cell | Logical OR | Logical OR Result |
| A_left key + A_right key |  | 1 + 1 | 1 (allowed) |
| A_left key + B_right key |  | 1 + 1 | (not yet considered) |
| B_left key + A_right key |  | 1 + 1 | (not yet considered) |
| B_left key + B_right key |  | 1 + 1 | (not yet considered). |

Table 4, below, shows that a first of three disallowed cell edge interactions, i.e., A_left key+B_right key, can be added at bit number 1 of the to-be-determined four-bit alignment key. To assure that the superposition or logical OR operation applied to the A_left key and the B_right key for bit number 1 will result in a bit value of 0, the keys A_left and B_right are assigned bit values of 0, while the keys A_right and B_left retain bit values of 1.

TABLE 4

| KEYS FOR BIT NUMBERS 0 AND 1 | | |
|---|---|---|
|  | Bit Number | |
|  | 0 | 1 |
| A_left key | 1 | 0 |
| B_left key | 1 | 1 |
| A_right key | 1 | 1 |
| B_right key | 1 | 0. |

Table 5, below, shows that when the keys of the right-positioned cell and of the left-positioned cell interact according to a bit-wise logical OR operation, only the first disallowed cell edge interaction, A_left and B_right, produces a 0 or a disallowed cell edge interaction for bit number 1 of the to-be-determined four-bit alignment key.

TABLE 5

INTERACTIONS FOR BIT NUMBERS 0 AND 1

| Right cell | Left cell | Logical OR | Logical OR Result |
|---|---|---|---|
| A_left key + A_right key | 10 + 11 | 11 (allowed) |
| A_left key + B_right key | 10 + 10 | 10 (disallowed) |
| B_left key + A_right key | 11 + 11 | (not yet considered) |
| B_left key + B_right key | 11 + 10 | (not yet considered). |

Table 6, below, shows that a second of three disallowed cell edge interactions, i.e., B_left+A_right, can be added at bit number 2 of the to-be-determined four-bit alignment key. To assure that the superposition or logical OR operation applied to the B_left key and the A_right key for bit number 2 will result in a bit value of 0, the keys B_left and A_right are assigned bit values of 0, while the keys A_left and B_right retain bit values of 1.

TABLE 6

ALIGNMENT KEYS FOR BIT NUMBERS 0, 1 AND 2

| | Bit Number | | |
|---|---|---|---|
| | 0 | 1 | 2 |
| A_left key | 1 | 0 | 1 |
| B_left key | 1 | 1 | 0 |
| A_right key | 1 | 1 | 0 |
| B_right key | 1 | 0 | 1. |

Table 7, below, shows that when the keys of the right-positioned cell and of the left-positioned cell interact according to a bit-wise logical OR operation, only the second disallowed cell edge interaction, B_left and A_right, produces a 0 or a disallowed cell edge interaction in bit number 2 of the to-be-determined four-bit alignment key.

TABLE 7

INTERACTIONS FOR BIT NUMBERS 0, 1 AND 2

| Right cell | Left cell | Logical OR | Logical OR Result |
|---|---|---|---|
| A_left key + A_right key | 101 + 110 | 111 (allowed) |
| A_left key + B_right key | 101 + 101 | 101 (disallowed) |
| B_left key + A_right key | 110 + 110 | 110 (disallowed) |
| B_left key + B_right key | 110 + 101 | (not yet considered). |

Table 8, below, shows that a third of three disallowed cell edge interactions, i.e., B_left+B_right, can be added at bit number 3 of to the to-be-determined four-bit alignment key. To assure that the superposition or logical OR operation applied to the B_left key and the B_right key for bit number 3 will result in a bit value of 0, the keys B_left and B_right are assigned bit values of 0, while the keys A_left and A_right retain bit values of 1.

TABLE 8

ALIGNMENT KEYS FOR BIT NUMBERS 0, 1, 2 AND 3

| | Bit Number | | | |
|---|---|---|---|---|
| | 0 | 1 | 2 | 3 |
| A_left key | 1 | 0 | 1 | 1 |
| B_left key | 1 | 1 | 0 | 0 |
| A_right key | 1 | 1 | 0 | 1 |
| B_right key | 1 | 0 | 1 | 0. |

Table 9, below, shows that when the keys of the right-positioned cell and of the left-positioned cell interact according to a logical OR operation, only the third disallowed cell edge interaction, B_left and B_right, produces a 0 or a disallowed cell edge interaction for bit number 3 of the to-be-determined four-bit alignment key.

TABLE 9

INTERACTIONS FOR BIT NUMBERS 0, 1, 2 AND 3

| Right cell | Left cell | Logical OR | Logical OR Result |
|---|---|---|---|
| A_left key + A_right key | 1011 + 1101 | 1111 (allowed) |
| A_left key + B_right key | 1011 + 1010 | 1011 (disallowed) |
| B_left key + A_right key | 1100 + 1101 | 1101 (disallowed) |
| B_left key + B_right key | 1100 + 1010 | 1110 (disallowed). |

Thus, looking to Table 9, we can see that a four-bit alignment key value of 1111 has been generated for the one allowed cell edge interaction, while each of the remaining three disallowed cell edge interactions has generated a four-bit alignment key value containing but one zero in one of the three remaining bit numbers 1, 2, and 3, to identify the particular disallowed cell edge interaction.

Referring to FIG. 4A, nine possible cell edge interactions 401 along the x-axis of an exemplary rectilinear array including three types of cells—cell A, cell B, and cell C—may be mapped to a nine-bit alignment key 402 represented by bit numbers 0-8 as shown in FIG. 4B. Using the methods similar to those described above for FIG. 2A-D, allowed cell edge interactions may result in a nine-bit alignment key having a bit value of 111111111, while each disallowed cell edge interaction may result in having a nine bit alignment key bit value with a bit value of 0 in a corresponding one of the nine bits of the nine-bit alignment key.

Figure 5B:
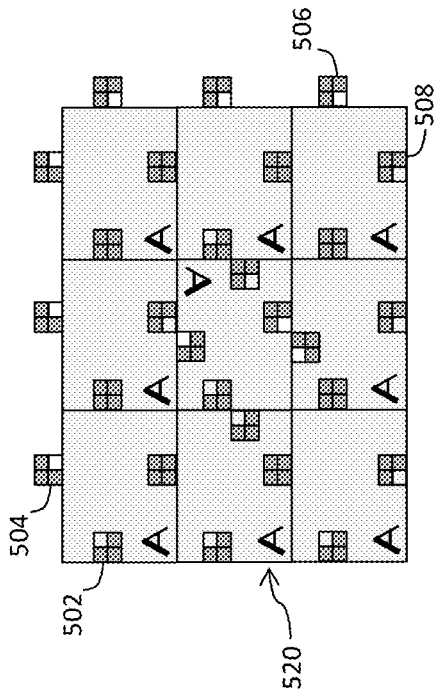
FIG. 5B is a schematic illustrating an incorrectly-oriented centrally-located cell A that has been incorrectly rotated 180° in a physical layout design.
Figure 5D:
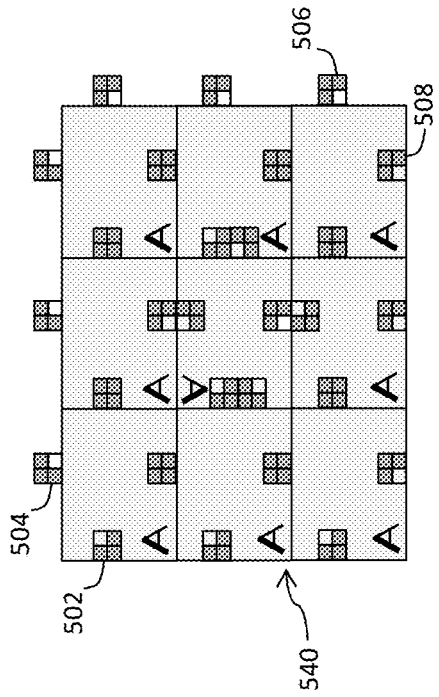
FIG. 5D is a schematic illustrating an incorrectly-oriented centrally-located cell A that has been incorrectly flipped about its bottom edge in a physical layout design.
Figure 5A:
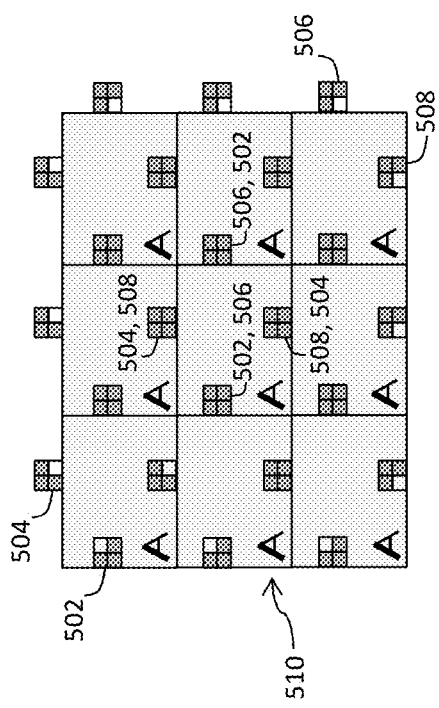
FIG. 5A is a schematic illustrating a correctly-oriented centrally-located cell A in a physical layout design.

Referring to FIG. 5A, each exemplary pair of abutting cells A along the x-axis and y-axis of a top level physical layout of the array 510 is oriented, such that alignment key shapes, i.e., A_left 502, A_top 504, A_right 506, and A-bottom 508, of the centrally-located cell A will superimpose in an allowed cell edge interaction with each abutting cell A, creating a completely-filled alignment key shape to be checked by a conventional design rule check (DRC) for correct orientation of placement. For example, the alignment key shape A_left 502 of the centrally-positioned cell A of the array 510 is superimposed on alignment key shape A_right 506 of the left-positioned cell A to create a completely-filled alignment key shape 502, 506. Similarly, the alignment key shapes A_top 504, A_right 506, and A_bottom 508 of the centrally-positioned cell A are respectively superimposed on the alignment key shapes A_bottom 508 of the top-positioned cell A, A_left 502 of the right-positioned cell A, and A_top 504 of the bottom-positioned cell A, to create completely-filled alignment key shapes of the correct size: 502,

506; 504, 508; 506, 502; and 508, 504, which when checked by the DRC indicate a correctly oriented placement of the centrally-located cell A.

Figure 5C:
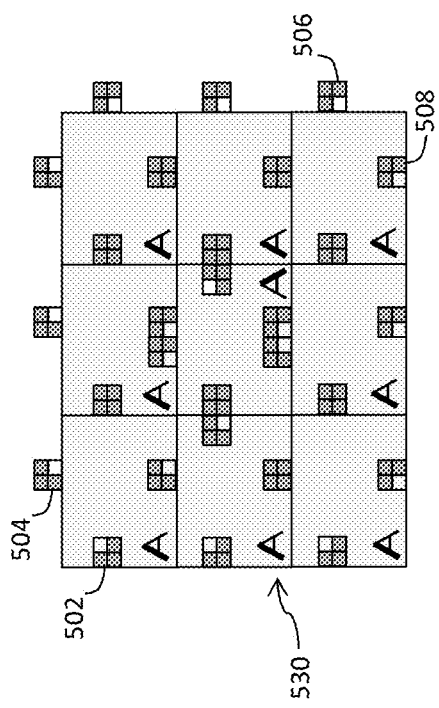
FIG. 5C is a schematic illustrating an incorrectly-oriented centrally-located cell A that has been incorrectly flipped about its left edge in a physical layout design.

In contrast, as shown in FIG. 5B, if the centrally-positioned cell of the array 520 is incorrectly oriented, i.e., rotated, by 180°, then the alignment key shapes located along each of the four cell edge interactions of the centrally-positioned cell do not superimpose on the alignment key shapes of the abutting cells, to create completely-filled alignment key shapes, and so fail the DRC. Similarly, as shown in FIG. 5C, if the centrally-positioned cell is "flipped" about its left cell edge in array 510, then the alignment key shapes located along each of the four cell edge interactions of the left-flipped centrally-positioned cell in the array 530 do not superimpose on the abutting cells, to create completely-filled alignment key shapes, and so fail the DRC, and as shown in FIG. 5D, if the centrally-positioned cell is "flipped" about its bottom edge in array 510, then the alignment key shapes located along each of the four cell edge interactions of the bottom-flipped centrally-positioned cell in the array 540 do not superimpose on the abutting alignment key shapes to create completely-filled alignment key shapes, and so fail the DRC.

Figure 6:
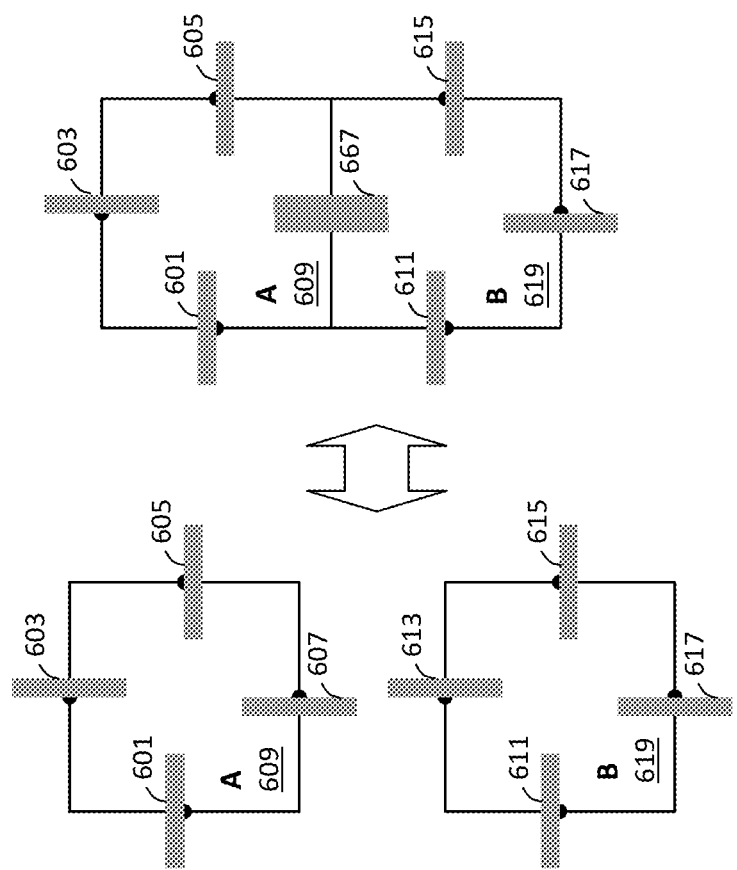
FIG. 6 is a schematic illustrating the juxtaposition of a first alignment key shape and a second alignment key shape on a common edge, to form a pre-defined shape of a correct size in a physical layout design.

In contrast to alignment key shapes that are graphically superimposed to indicate correct placement of abutting cells, FIG. 6 illustrates another exemplary method of the invention that graphically places each of alignment key shapes 607 and 613 of cells A 609 and cell B 619, respectively, transversely along the length of the common edge to form a pre-defined shape 667, indicating correct placement. For example, the alignment key shapes 607 and 613 are each located along the length of the common edge, such that, correct placement of the abutting cells is indicated by the side-by-side juxtaposition of alignment key shapes 607 and 613 to form the pre-defined shape 667 of a correct size.

Figure 7C:
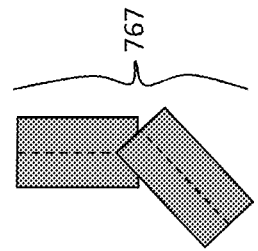
FIG. 7C is a schematic illustrating the more complicated pre-defined design of the alignment key shapes of FIG. 7B.
Figure 7B:
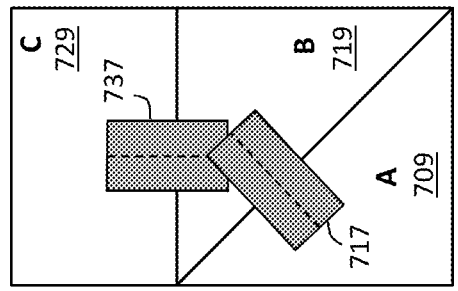
FIG. 7B is a schematic illustrating the juxtapositioning of the three cells of FIG. 7A and their alignment key shapes in a physical layout design.
Figure 7A:
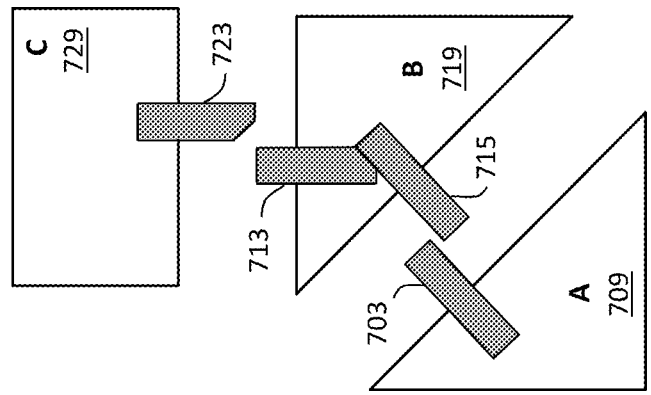
FIG. 7A is a schematic illustrates three cells, each cell having one or more alignment key shapes.

Referring to FIG. 7A-C, alignment key shapes transversely placed along the length of a common edge of abutting cells may also form more complicated pre-defined shapes to indicate correct placement of the abutting cells. For example, FIG. 7A illustrates three types of cells, cell A 709, cell B 719 and cell C 729, which possess alignment key shapes, 703, 713 and 715, and 723, respectively. Cells A 709 and B 719 are triangular in shape and when correctly placed to abut one another, juxtapose side-by-side, alignment key shapes 703 and 715 to form a rectangle 717 of a correct shape and size, as shown in FIG. 7B. Similarly, when rectangularly-shaped cell C 729 is correctly placed to abut triangularly-shaped cell B 719, alignment key shapes 713 and 723 are juxtaposed side-by-side to form a notched-rectangle 737 of a correct shape and size, as shown in FIG. 7B. When cells A 709, B 719 and C 729 are correctly placed, the rectangle 717 fits the notch of the notched rectangle 737 to form the more complicated predefined shape 767 of the correct size, which is shown in FIG. 7C.

Figure 8:
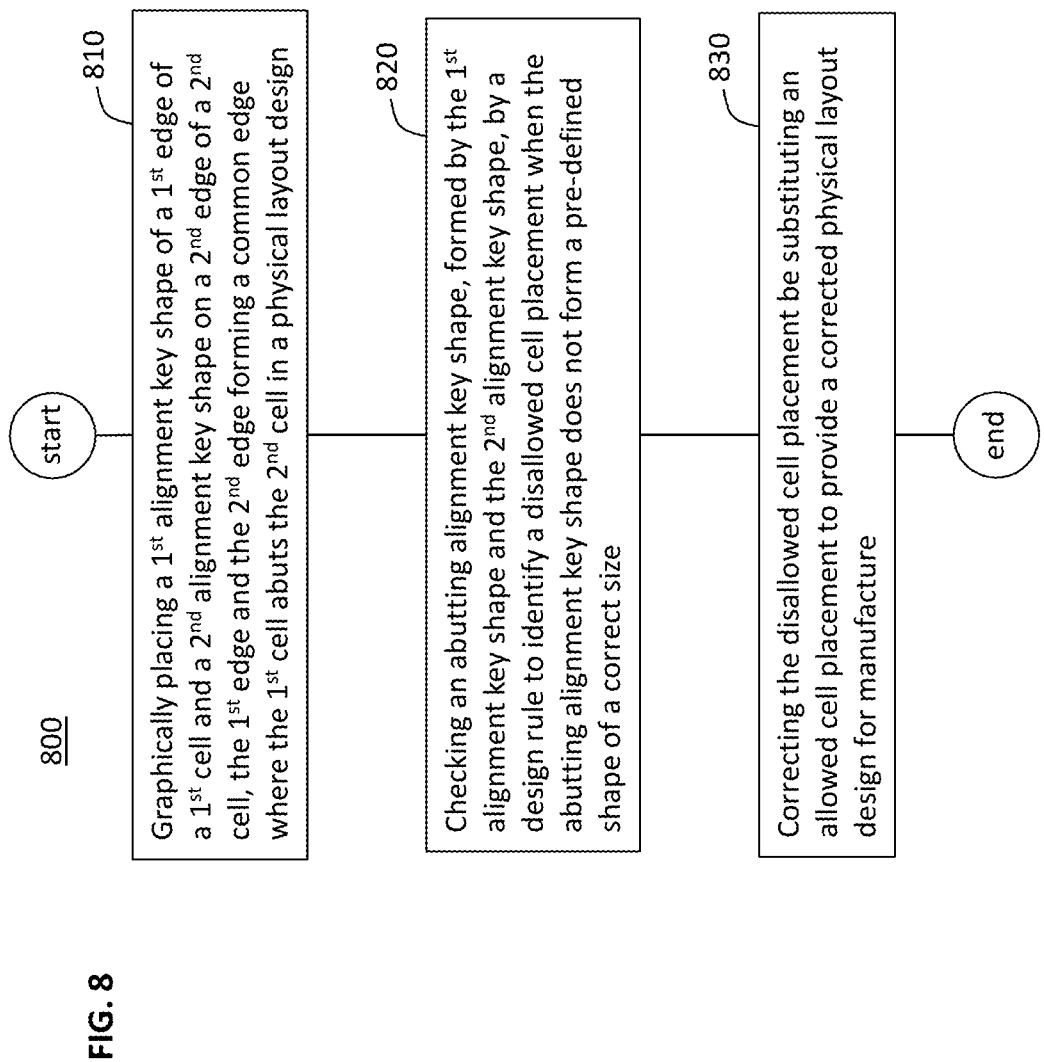
FIG. 8 is a flowchart 800 illustrating a method for placing pre-defined cells in a physical layout design that is free of placement errors when validated by a design rule check.

Referring to FIG. 8, a flowchart 800 illustrates a method for placing pre-defined cells in a physical layout design that is free of cell placement errors when validated by a design rule check (DRC) The method includes graphically placing, by an electronic design tool, a first alignment key shape on a first edge of a first cell and a second alignment key shape on a second edge of a second cell, the first edge and the second edge forming a common edge where the first cell abuts the second cell in a physical layout design of an integrated circuit, 810. The method also includes checking an abutting alignment key shape, formed by placing the first alignment key shape and the second alignment key shape in the physical layout design, by a design rule to identify a disallowed cell placement of the first cell relative to the second cell when the abutting alignment key shape does not form a pre-defined shape of a correct size, 820. Finally, the method includes correcting, by a designer, the disallowed cell placement by substituting an allowed cell placement to provide a corrected physical layout design for manufacture of the integrate circuit, 830.

Figure 9:
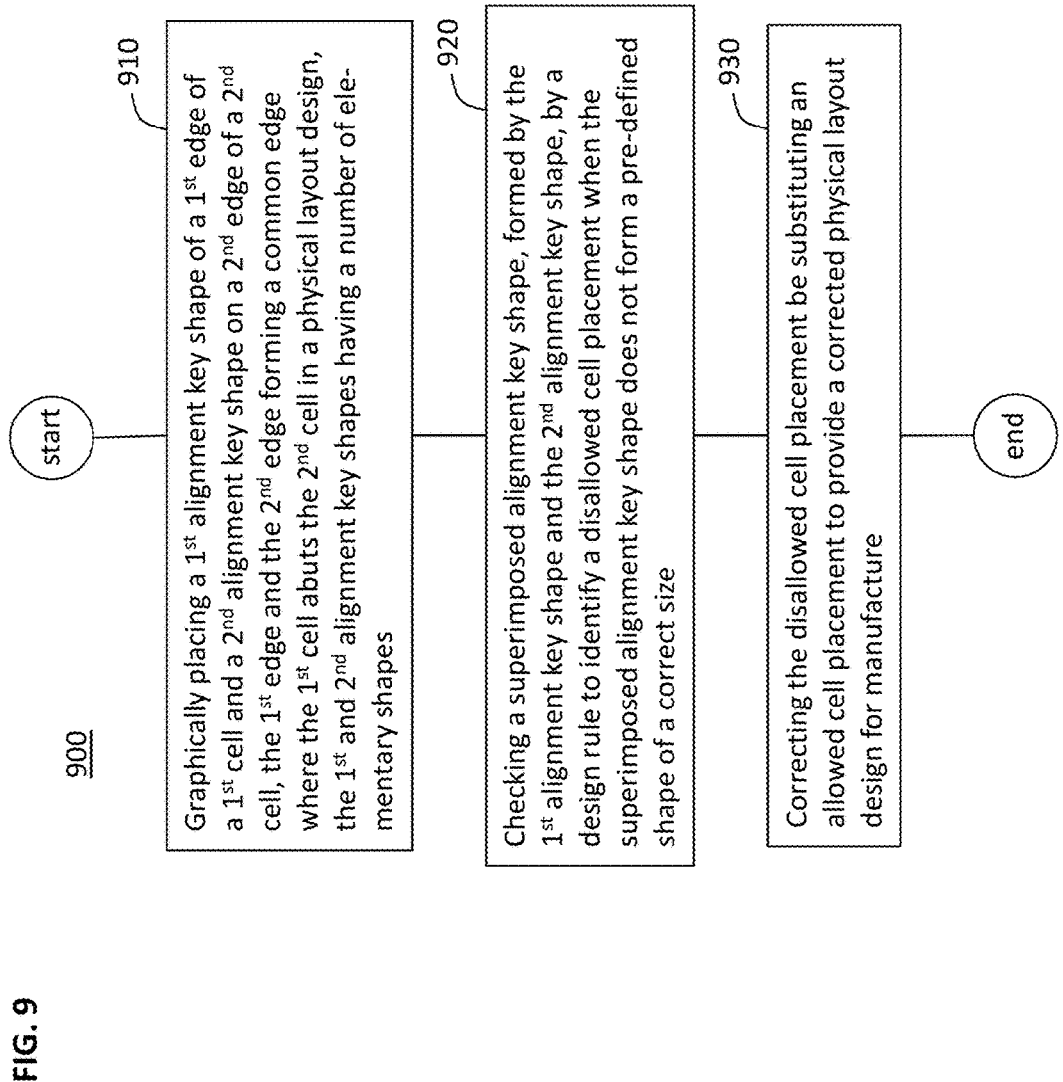
FIG. 9 a flowchart 900 illustrating a method for placing pre-defined cells in a physical layout design that is free of placement errors when validated by a design rule check.

Referring to FIG. 9 a flowchart 900 illustrates another method for placing pre-defined cells in a physical layout design that is free of cell placement errors when validated by a design rule check (DRC). The method includes graphically placing, by an electronic design tool, a first alignment key shape on a first edge of a first cell and a second alignment key shape on a second edge of a second cell, the first edge and the second edge forming a common edge where the first cell abuts the second cell in a physical layout design of an integrated circuit (IC), the first alignment key shape and the second alignment key shape each comprising a number of elementary shapes, 910. The method also includes checking a superimposed alignment key shape, formed by superimposing the first alignment key shape and the second alignment key shape, by a design rule to identify a disallowed cell placement of the first cell relative to the second cell when the superimposed alignment key shape does not form a pre-defined shape, 920 Finally, the method includes correcting, by a designer, the disallowed cell placement by substituting an allowed cell placement, to provide a corrected physical layout design for manufacture of the IC, 930.

Also disclosed herein is a computer program product that implements the method for placing pre-defined cells in a physical layout design that is free of cell placement errors when validated by a design rule check (DRC), as described, above. The computer program product can comprise a computer readable storage medium having program instructions embodied therewith (e.g., stored thereon). These program instructions can be executable by the computer to cause the computer to perform the above-described method for thermal modeling. More particularly, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
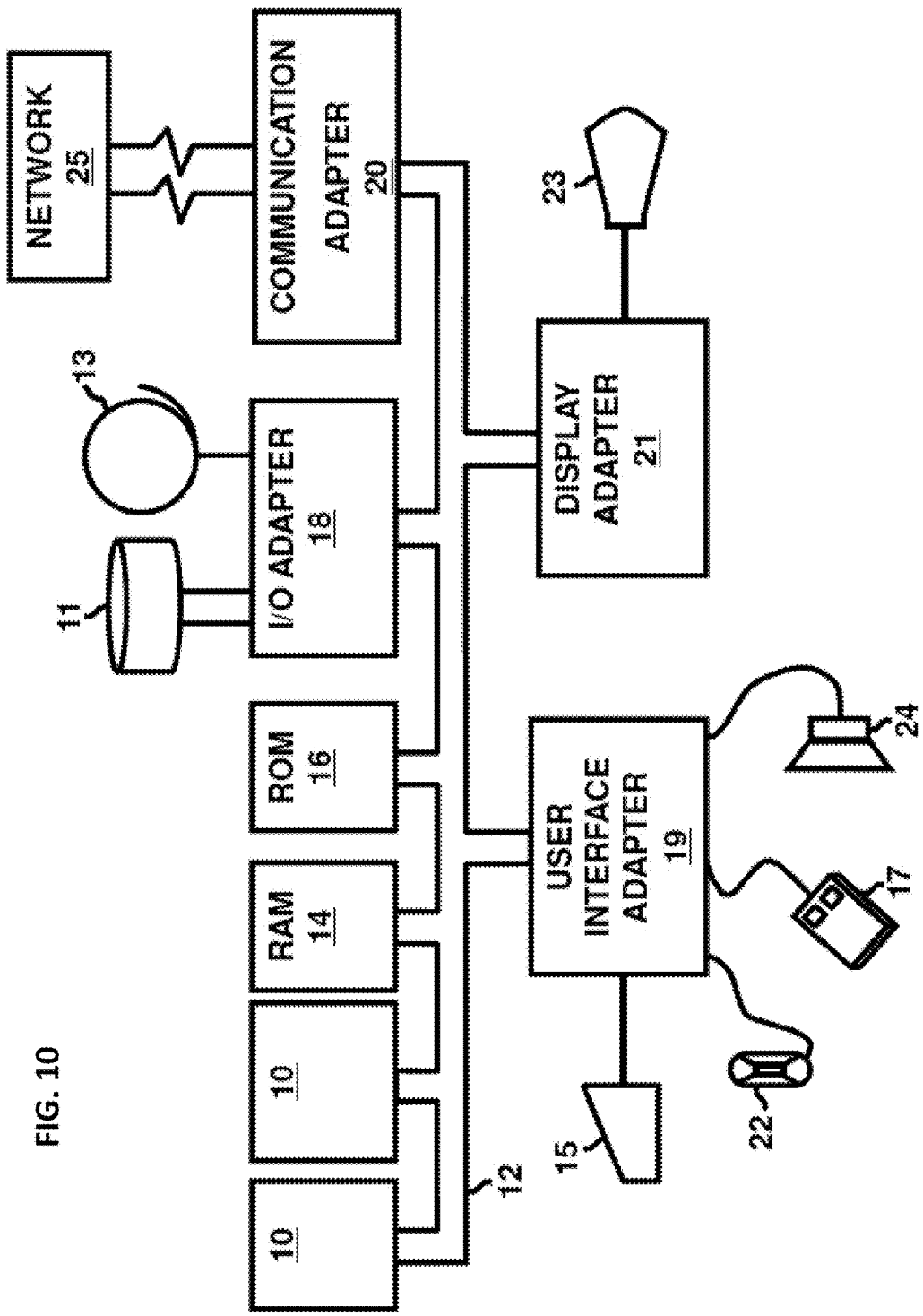
FIG. 10 is a schematic illustrating a hardware environment for a computer program product that implements the method for placing pre-defined cells in a physical layout design that is free of cell placement errors when validated by a design rule check.

A representative hardware environment (i.e., a computer system) for implementing the system, method and computer program product for thermal modeling described above is depicted in FIG. 10. This schematic drawing illustrates a hardware configuration of an information handling/computer system in accordance with the embodiments herein. The system comprises at least one processor or central processing unit (CPU) 10. The CPUs 10 are interconnected via a system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

What is claimed is:

1. A method of correcting a physical layout design by an electronic design tool executed by a computer for manufacture of an integrated circuit (IC), comprising:

graphically placing, by the electronic design tool executed by the computer, a first alignment key shape on a first edge of a first cell having a first orientation and a second alignment key shape on a second edge of a second cell having a second orientation on an alignment layer created by the electronic design tool, the first edge and the second edge forming a common edge where the first cell abuts the second cell according to the physical layout design of IC;

checking, by the electronic design tool, an abutting alignment key shape, formed by graphically placing the first alignment key shape and the second alignment key shape on the alignment layer according to the physical layout design, by a design rule to identify a disallowed cell placement of the first cell relative to the second cell when the abutting alignment key shape does not form a pre-defined abutting alignment key shape of a correct size;

graphically outputting, by the electronic design tool, the disallowed cell placement identified by the design rule on the alignment layer;

substituting, by the design tool on the alignment layer, an allowed cell placement by another cell that has another alignment key shape and abuts the second cell along the common edge, to form the pre-defined abutting alignment key shape of the correct size and provide a corrected physical layout design; and manufacturing the IC with the corrected physical layout design.

2. The method of claim 1, the second cell being one of: the same as the first cell, and different from the first cell.

3. The method of claim 1, further comprising identifying all cells of the physical layout design to be checked by the design rule.

4. The method of claim 1, the design rule being a pre-existing design rule implemented by the electronic design tool on the abutting alignment key shape of the alignment layer according to the physical layout design.

5. The method of claim 1, further comprising storing the first alignment key shape on the first edge of the first cell having the first orientation and the second alignment key shape on the second edge of the second cell having the second orientation in the electronic design tool, to create the alignment layer according to the physical layout design.

6. A method of correcting a physical layout design by an electronic design tool executed by a computer for manufacture of an integrated circuit (IC), comprising:

graphically placing, by the electronic design tool executed by the computer, a first alignment key shape on a first edge of a first cell and a second alignment key shape on a second edge of a second cell on an alignment layer created by the electronic design tool, the first edge and the second edge forming a common edge where the first cell abuts the second cell according to a physical layout design of an IC, the first alignment key shape and the second alignment key shape each comprising a number of elementary shapes, each elementary shape graphically representing one of: an allowed cell edge interaction and a disallowed cell edge interaction;

checking, by the electronic design tool, a superimposition of an abutting alignment key shape, formed by graphically superimposing the first alignment key shape and the second alignment key shape on the alignment layer according to the physical layout design, by a design rule, to identify a disallowed cell placement of the first cell relative to the second cell when the superimposed abutting alignment key shape does not form a pre-defined abutting alignment key shape;

graphically outputting, by the electronic design tool, the disallowed cell placement identified by the design rule on the alignment layer;

substituting, by the design tool on the alignment layer, an allowed cell placement by another cell that has another alignment key shape and abuts the second cell along the common edge, to form the superimposition of the pre-defined abutting alignment key shape and provide a corrected physical layout design; and manufacturing the IC with the corrected physical layout design.

7. The method of claim 6, the second cell being one of: the same as the first cell, and different from the first cell.

8. The method of claim 6, the corresponding number of possible cell edge interactions depending on a number of different types of cells that interact along the common edge of the first cell and the second cell.

9. The method of claim 8, further comprising defining for each cell edge interaction between the first cell and the second cell, a multi-bit alignment key binary value having a number of bits equal to the number of possible cell edge interactions, where a bit-wise logical OR-ing of corresponding bit values of the first alignment key shape and the second alignment key shape produce one of: a bit value of 1 corresponding to an allowed cell edge interaction and a bit value of 0 corresponding to a disallowed cell edge interaction.

10. The method of claim 9, further comprising assigning one bit of the multi-bit alignment key binary value to a single disallowed cell edge interaction.

11. The method of claim 9, an allowed cell edge interaction graphically displaying a filled elementary shape and a disallowed cell edge interaction graphically displaying an unfilled elementary shape in the pre-defined abutting alignment key shape.

12. A computer program product readable by a computer tangibly embodying a program of instructions executable by the computer to perform a method of correcting a physical layout design by an electronic design tool executed by a computer for manufacture of an integrated circuit (IC), comprising:

graphically placing, by the electronic design tool executed by the computer, a first alignment key shape on a first edge of a first cell having a first orientation and a second alignment key shape on a second edge of a second cell having a second orientation on an alignment layer created by the electronic design tool, the first edge and the second edge forming a common edge where the first cell abuts the second cell according to a physical layout design of IC;

checking, by the electronic design tool, an abutting alignment key shape, formed by graphically placing the first alignment key shape and the second alignment key shape on the alignment layer according to the physical layout design, by a design rule to identify a disallowed cell placement of the first cell relative to the second cell when the abutting alignment key shape does not form a pre-defined abutting alignment key shape of a correct size; and graphically outputting, by the electronic design tool, the disallowed cell placement identified by the design rule on the alignment layer;

substituting, by the design tool on the alignment layer, an allowed cell placement by another cell that has another alignment key shape and abuts the second cell along the common edge to form the pre-defined abutting alignment key shape of the correct size and provide a corrected physical layout design; and manufacturing the IC with the corrected physical layout design.

13. The computer program product of claim 12, the second cell being one of: the same as the first cell, and different from the first cell.

14. The computer program product of claim 12, the method further comprising identifying all cells of the physical layout design to be checked by the design rule.

15. The computer program product of claim 12, the design rule being a pre-existing design rule implemented by the electronic design tool on the abutting alignment key shape of the alignment layer according to the physical layout design.

16. The computer program product of claim 12, further comprising storing the first alignment key shape on the first edge of the first cell having the first orientation and the second alignment key shape on the second edge of the second cell having the second orientation in the electronic design tool, to create the alignment layer according to the physical layout design.

\* \* \* \* \*